United States Patent [19]

Armstrong

[11] Patent Number: 4,852,418
[45] Date of Patent: Aug. 1, 1989

[54] NUTATING DRIVE

[76] Inventor: Richard J. Armstrong, 17 Alcorn Avenue, 2nd Floor, Toronto, Ontario, Canada, M4V 1E5

[21] Appl. No.: 31,358

[22] Filed: Mar. 30, 1987

[51] Int. Cl.⁴ .................................................. F16H 23/08
[52] U.S. Cl. .............................. 74/60; 92/12.2; 417/269
[58] Field of Search ...................... 74/60; 417/269; 92/12.2

[56] References Cited

U.S. PATENT DOCUMENTS

| | | | |
|---|---|---|---|
| 1,154,303 | 9/1915 | Froehlich | 74/60 |
| 2,430,788 | 11/1947 | Sherman | 74/60 |
| 2,463,818 | 3/1949 | Sparmann | 74/60 |
| 2,940,325 | 6/1940 | Nakesch | 74/60 |
| 3,180,159 | 4/1965 | Girodin | 74/60 |
| 3,198,022 | 8/1965 | De Waern | 74/60 |
| 3,257,855 | 6/1966 | Dangauthier | 74/60 |
| 4,106,354 | 8/1978 | Girodin | 74/60 |
| 4,565,118 | 1/1986 | Girodin | 74/60 |

FOREIGN PATENT DOCUMENTS

| | | | |
|---|---|---|---|
| 1364086 | 5/1964 | France | 74/60 |
| 313404 | 12/1933 | Italy | 74/60 |

Primary Examiner—Allan D. Herrmann

[57] ABSTRACT

A nutation frame is mounted on a base at a fulcrum connection for limited angular movement about those axes which are perpendicular to a nutation axis and is restricted against cumulative rotary movement about the nutation axis. The nutation frame rigidly connects reciprocating connections on axes approximately parallel to the nutation axes and radially spaced therefrom and a member designed for circular motion about said axis being axially displaced from said fulcrum. The frame can thus convert circular movement about the nutation axis to reciprocating movement or vice versa.

7 Claims, 4 Drawing Sheets

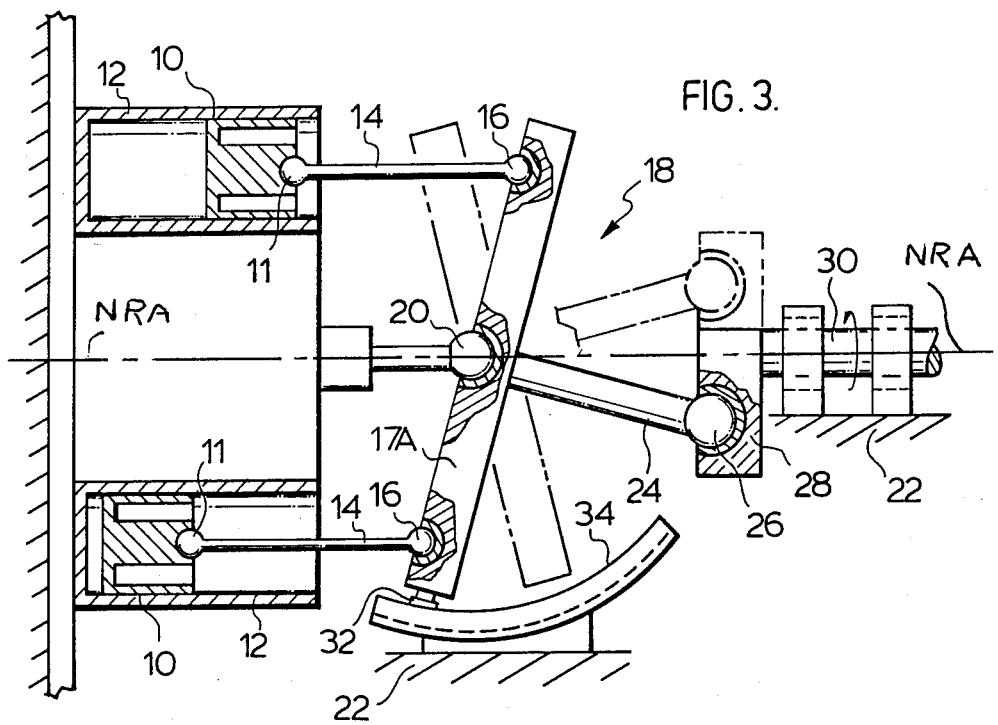
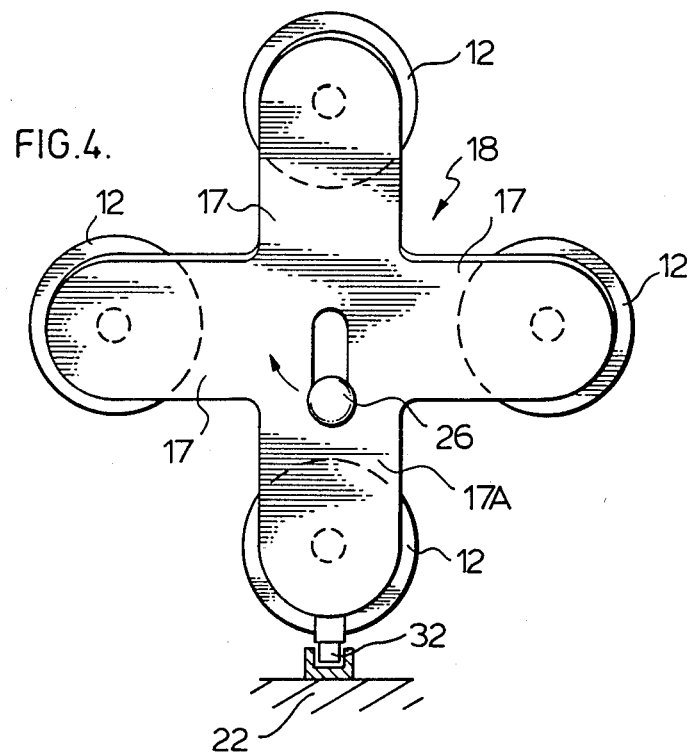

1

NUTATING DRIVE

This invention relates to means for converting rotary motion to motion, or vice versa, where the rotary axis and the reciprocating direction are aligned, or approximately so, and where the means involves use of a nutating drive.

In a nutating drive a plate or frame is mounted on a universal joint (called the nutation point) controlled to slope at a given angle to an axis of symmetry (the axis of nutation) through the joint while the direction or slope (although not necessarily the frame) is rotated continually about the axis of symmetry. When the plate or frame is connected to a plurality of reciprocating members, whose reciprocation axis is aligned with the axis of symmetry, then nutation of the plate caused by an input drive rotating about the axis of symmetry will cause output reciprocation of the reciprocating members. Conversely input reciprocation of the reciprocating members in the proper phase relation will cause rotation of the slope of plate or frame and with proper coupling means will cause consequent output rotation of the shaft. This will be obvious from th schematic indication of FIG. 1 which is taken from a prior art sketch. The drive, shown, has been found inefficient because of friction and/or wear between the reciprocating members and the plate or frame. The disadvantages have been decreased but not removed by adding to the showing of FIG. 1 a ring movable with the reciprocating member, nutating but not rotating, and riding on the plate shown with roller, or ball bearings. FIG. 2 shows a device invented by Callan in 1906, where the nutating frame F is driven by four equiangularly disposed pistons (only two are shown in the section), in 90° spaced phase relationships, to cause nutation of the frame. Such nutation causes the shaft S1, which is pivotally connected to the frame running on bearings B to follow a conical locus as determined by rotatable crank C, which movement of S1 on a conical locus causes rotation of output shaft S2. An engine is thus provided. Conversely an input drive connected to shaft S2 will cause nutation of frame F which will reciprocate the pistons P in phase so that they may perform pumping or other reciprocating actions. Disadvantages of this arrangement have been that the torque and rotational load on the bearings B for shaft S1 has caused wear, lubrication problems and inefficiency. The same problems have been caused by the fact that, in the Callan device, the nutation point P for the frame, not only acts as a fulcrum but must also transmit the drive between shafts S1 and S2.

In applicant's invention a nutation frame is restrained from cumulative rotation about the nutation axes, while being allowed to nutate about the nutation point (sometimes called the fulcrum connection herein), (which is on such axis), that is it may go through angular motion about all axes perpendicular to the nutation axis as the direction of slope of the nutation frame rotates about this axis. A number, usually three or more, of reciprocating devices are symmetrically disposed about the axis for reciprocating along axes parallel to the nutation axis driven over a connection (sometimes called the reciprocation connection herein) by the nutation frame at locations radially disposed from the nutation axis. A revolving point on the nutation frame is limited to describe a circle about the nutation axis axially displaced from the nutating point. The frame forms a rigid connection between the nutation point, the revolving point and the reciprocating member connections. The frame thus acts in a manner somewhat analogous to a bell crank (lever) where the nutation point is the fulcrum, the revolving point at the end of one arm of the lever and the connections to the reciprocating members represent multiple, symmetrically disposed 'other arms' of the lever. The friction, wear and inefficiency of the Callan engine are avoided because my rigid nutation frame does not require bearings similar to bearings B of Callan and applicant's nutation point is merely a fulcrum and is not used to transfer the drive torque. The rotary degree of freedom is not required in the conversion (that is, it is not required between the frame reciprocation points and the revolving point) and elimination of an unnecessary degree of freedom results in a less complex device.

Applicant's device in one of its two main aspects thus provides an efficient drive which may act as an engine with reciprocating input and rotary output. The pistons may be driven by any suitable fluid applied in the proper phase relationship. The piston stroke may be made of any desired length merely by altering the eccentricity of the rotating shaft connector. Considering the shortest stroke length, this may be made much shorter than that dictated by the minimum usable throw of a crankshaft. My device, in its other main aspect also provides an efficient device when used with a rotary input and a reciprocating output such as for a pump. The reciprocating output stroke may be varied as described and may, for example, be made as short as possible and much shorter than presently available with comparable pumps. The motion of the pistons responsive to the rotary input drive is almost sinusoidal (approaching the sinusoid more closely as the stroke is shortened) with considerable advantage in pumping and other applications.

For the basis of the nutating drive see "Kinematics" by H. B. Tyson, John Wiley and Sons Inc. New York, London and Sydney, 1966. For a more completed drawing of the Callan Engine see SAE Journal (Transactions), Vol. 47, No. 6, December 1940.

In drawings which illustrate a preferred embodiment of the invention:

FIG. 3 is a side, schematic view showing means for converting rotary to reciprocating drive, or vice versa, in accord with this invention, FIG. 4 is an axial view of the nutation frame and cylinders of FIG. 3.

Figure 5:
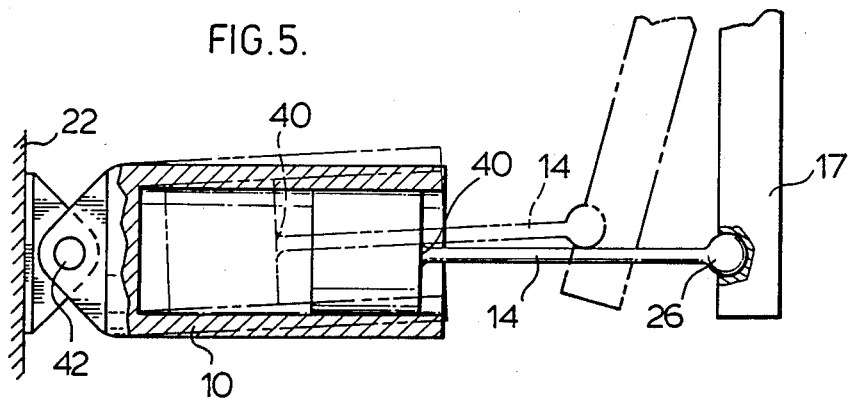
FIG. 5 shows piston nutation frame connection as an alternate to the corresponding connection in FIG. 3.

In FIGS. 3-5 is shown a somewhat schematic representation of an engine in accord with applicant's invention. Four pistons 10 are provided for driving in the extension direction by the expansion of compressed air or $CO_2$ in cylinders 12. It will be understood that the four pistons 10 are to be driven in a cyclical sequence, clockwise as shown in FIG. 4 at times T/4, 2T/4, 3T/4, T where T is the time of one operating cycle. Valving for the cylinders and sequential supply of the actuating gas to the cylinders may be done by conventional means and is not shown. Each piston 10 is connected by a universal joint 11 to one end of a link 14 extending generally in the direction of piston travel, that is, the reciprocation axis for the piston. The other end of each link 14 is connected by a universal joint 16 to an arm 17 of the nutation frame 18. The nutation frame 18 is mounted at a universal joint 20 on the base, schematically indicated at several locations on the drawings as 22. The universal joints 20 and 16 are in the same plane. The plane through joint 20 parallel to joints 16 is known as the nutation plane. If the joints 20 are spaced from the nutation plane translations are introduced into the portions of such ball joints which are avoided if points 16 are in the plane Thus it will be seen that 20 represents the nutation point for a nutation frame 18 and that pistons 10 are symmetrically and equiangularly distributed about an axis, known as the nutation axis shown as line NRA—NRA in the drawings. Although the nutation plane is never perpendicular to the nutation axis because of motion constraints to be described hereafter, the positions of universal joints 16 will be preferably in the nutation plane and symmetrically and equiangularly spaced about universal joint 20.

Rigidly connected to the arms 17 is pin 24 extending transversely thereto and forming with arms 17 a rigid frame. The end of pin 24 remote from universal joint 20 is connected at a universal joint 26 to an eccentric location on the arm 28 rotating with a rotating shaft 30 restricted against axial movement whose rotation axis is coincident with the nutation axis NRA. For most applications the line from universal joint 20 to universal joint 26 is perpendicular to the lines from joint 20 to the joints 16. It is required that nutation frame 18 be restrained against cumulative rotation about the nutation axis. This may be performed in a number of ways. One way is to provide one arm 17A of the frame with an extension 32 which runs in a arcuate guide 34 attached to the base. Another way is to specially design a joint to replace universal joint 20 to prevent cumulative rotation about axis NRA while allowing such relative rotation about all axes perpendicular to axis NRA.

In operation of the device of FIGS. 3 and 4 as an engine, pistons 17 are progressively actuated at times T/4, T/2, 3T/4, T by supplies and controls which may be conventional, but are not shown, clockwise looking left in the drawing as illustrated in FIG. 3. Such action 'nutates' the frame 18 and, with cumulative rotation of the frame 18 prevented, causes the locus of pin 24 to describe a cone which includes ball joint 26, causing ball joint 26, arm 28 and shaft 30 to rotate in the same sense. Thus, the reciprocating motion of pistons 10 is converted to the rotary motion of shaft 30 about axis NRA which is parallel to the reciprocating axes of the pistons. .

Figure 1:
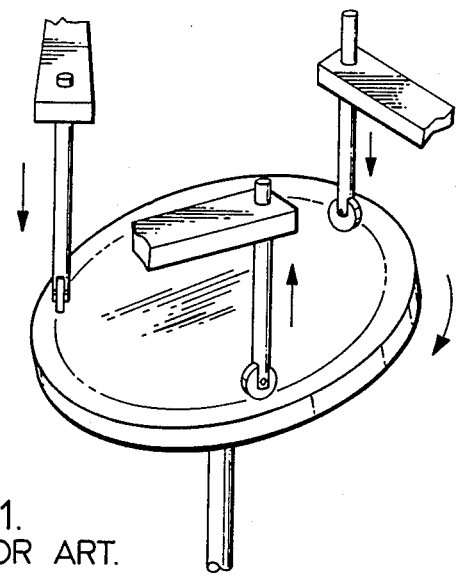
FIG. 1 is a schematic indication of the operation of a prior art drive.
Figure 2:
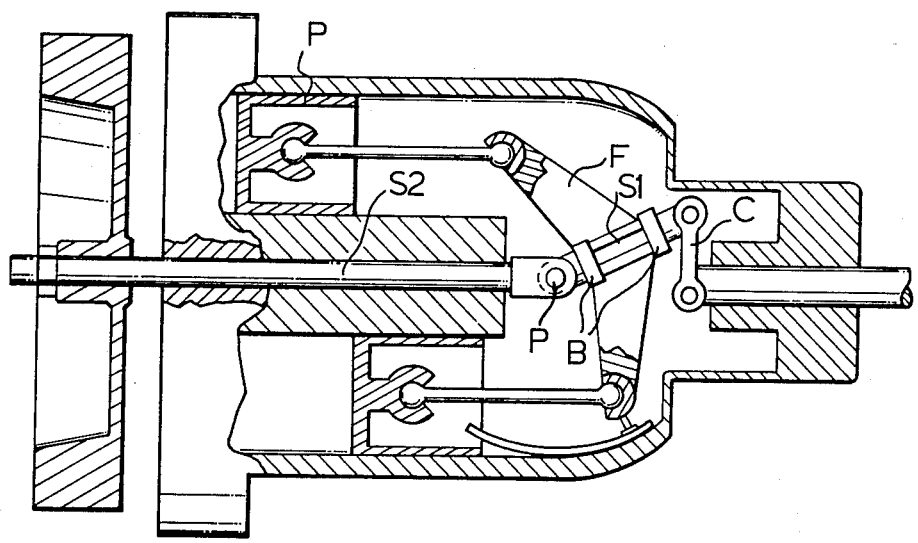
FIG. 2 is also prior art and is a schematic indication of the Callan engine.

A number of advantages accrue. The piston stroke may be made of any desired length by varying the eccentricity of universal joint 26, that is its radius from axis NRA. Such radius may be made adjustable. The piston stroke may be made almost as short as desired. This distinguishes the drive from the normal crankshaft where there are much larger lower limits to the 'throw' which the crankshaft may have. In the drive of the invention, the lower limit for piston stroke is only set by the 'play' in the universal joints 11,16,20,26. The strength and efficiency of the drive is greater than Callan (FIG. 2) since in my arrangement the frame rigidly connects joint 26, joint 20 and collectively the joints 20 with no rotating, pivoting or bearing connections between, which would require lubrication and resistance to large stresses. (A slight reversing rotational deviation during the nutation of frame 18 requires a small clearance for extension 32 in guide 34). For this reason it is noted that members 32, 34 prevent cumulative rotation of the frame It is noted that the input and output of the drive of FIG. 3-4 may be reversed. Thus rotation of shaft 30 by a motor, not shown, causes pin 24 to describe a conical locus, causing the nutation of frame 18 and the cyclical reciprocation of pistons 10. Thus a pump or other device using the reciprocating motion may be operated. The prior mentioned advantages accrue. Further advantages are that the stroke may be made almost as short as desired so that the pump may have four (as shown, or other number of) pistons with a very short stroke in comparison to other pumps. Also the movement of the pistons responsive to a constant rotation speed of shaft 30 is very nearly sinusoidal which results in very smooth acceleration in the piston cylinders. The small departure from sinusoidal motion is caused by the slight swing of universal joints 16 about nutation point 20 and the consequent effect on links 14 and pistons 10. Thus the departure from sinusoidal movement of pistons 10 is even less for a short piston stroke.

Some criteria for the joints or connections should be discussed.

Universal joint 11 need only allow movement about an axis perpendicular to the radius from axis NRA and thus be a pivot joint about this axis. Alternatively this joint 11 may be replaced by a fixed connection 40 if the piston cylinder 10 is pivotted relative to the base about an axis 42 perpendicular to the radius from axis NRA as shown in FIG. 5.

It is noted however that one of axis 42 or fixed connection 40 must allow sufficient play for the limited reversible rotational wobble discussed in connection with extension 32 an restraint 34.

Universal joints 16 and universal joint 20 must allow a certain degree of rotation in all axes perpendicular to, but need not allow rotation about, axis NRA except for the very limited reversible rotational deviation discussed in connection with extension 32 and restraint 34.

Universal joint 26 may be replaced with a simple swivel joint 26 defining a relative rotation axis coincident with the line from joint 26 to joint 20. The provision of the ball or swivel joint at 26 does not have the same stresses, lubrication or efficiency problems as the pivot and bearings B of Callan located adjacent the point of nutation and requiring the presence of heavy bearings difficult to machine accurately and lubricate.

For the engine or pump application the effective minimum number of equiangularly spaced reciprocating members appears to be three. A pump on reciprocating output with one output reciprocating member would be unbalanced and an output with two reciprocating members is not thought to have wide application.

Figure 6:
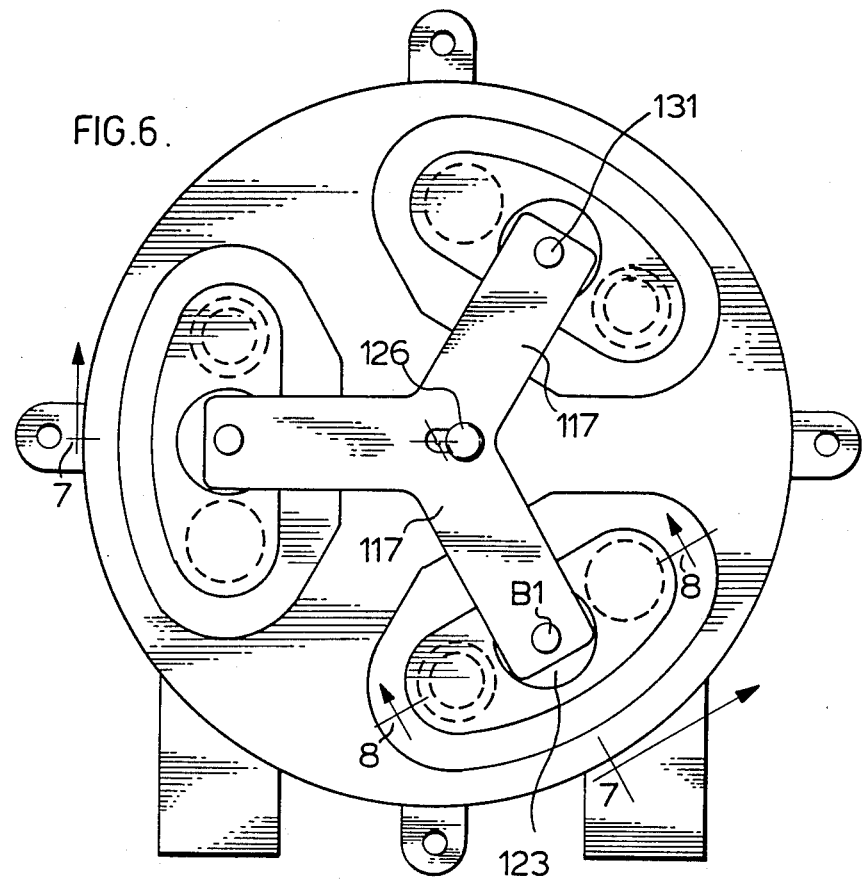
FIG. 6 is an axial view of a design for a nutating frame, diaphragm valve combination, using this invention.
Figure 7:
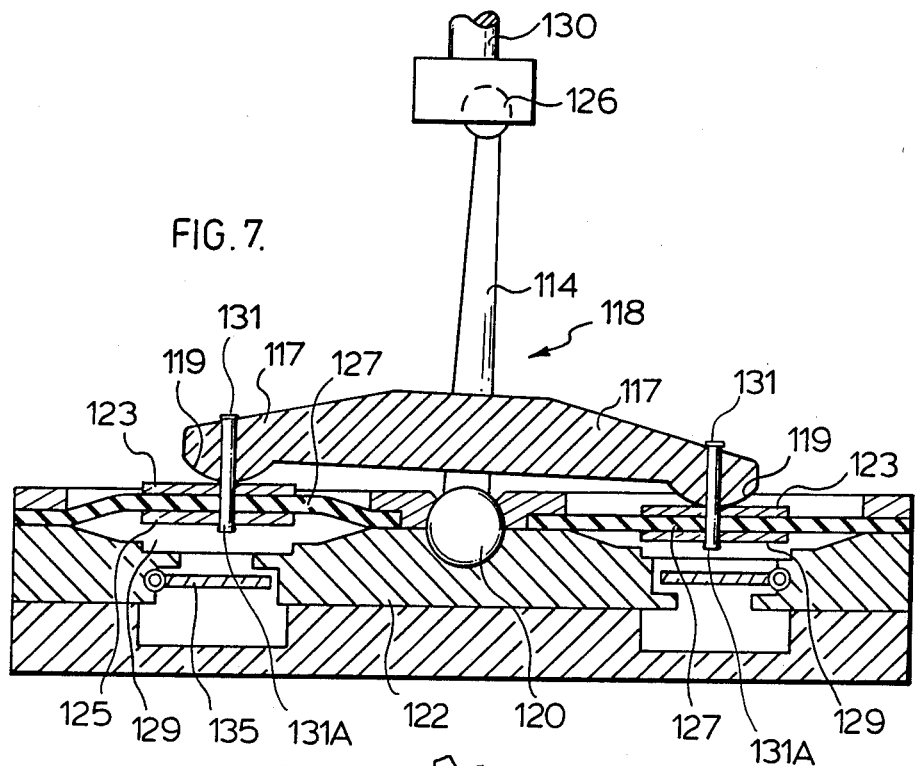
FIG. 7 is a sectional view along the lines 7—7 of FIG. 6, to which has been added the rotating shaft and eccentric connection for the nutation frame.
Figure 8:
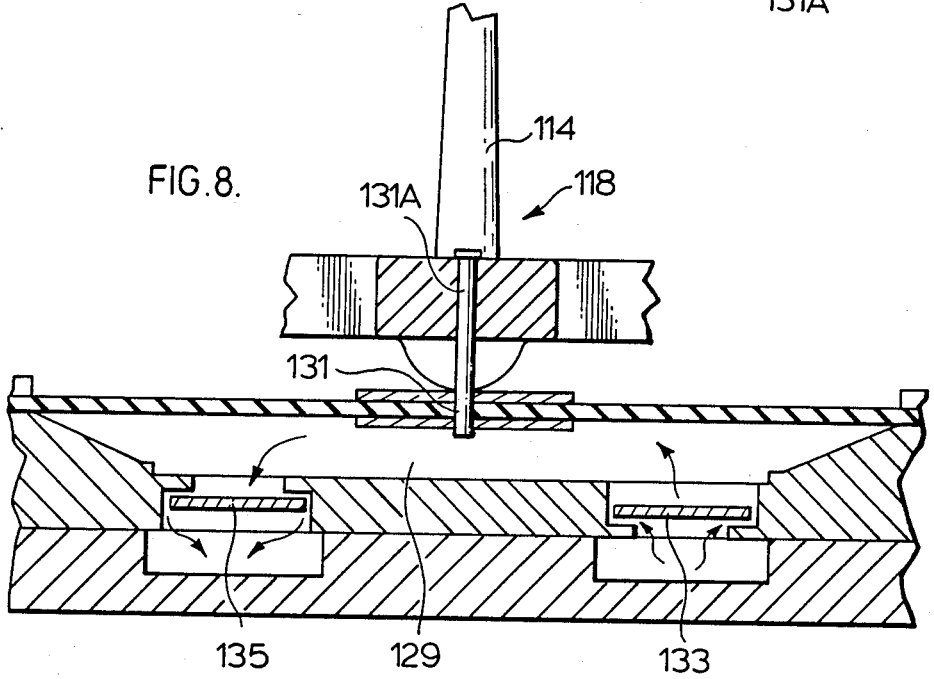
FIG. 8 is a portion of a sectional view along the lines 8—8 of FIG. 6.

In FIGS. 6 to 8 is shown a diaphragm pump in accord with the principles of the invention. It is assumed that a very short stoke is required. Numbering of elements in FIGS. 6 to 8 follows FIGS. 3 and 4 with 100 added. Shaft 130 restricted against axial movement is connection to pin 114 at the universal (or pivotal axis along the line from 126 to 120) joint 126 eccentric with respect to rotary (and nutation) axis NRA. Pin 114 forms part of nutation frame 118 which has three radial arms 117 extending transversely relative to the longitudinal axis of pin 114. Pin 114 extends downwardly to universal joint 120 on base 122, universal joint 120 defining the point of nutation and being located on axis NRA. At the end of each arm 117 a spherical convex downward pad 119 bears downwardly on a plate 123. The plate 123 together with plate 125 are connected to grasp a flexible diaphragm material 127 between them. The diaphragm 127 is designed to flex upwardly and downwardly over cavity 129. Downward movement of a pad 119 moves diaphragm 127 downward contracting the cavity 129. A bolt 131 will connect pad 119 and plates 123 and 129 to cause diaphragm 127 to rise as well as lower with the pads. The flexibility of the diaphragm material will allow it to change angle slightly to compensate for the change of angle of bolt 131 with the rocking arm. If desired the bolt 131 may be eliminated and the diaphragm raised by a spring. Each cavity 129 has a one way inlet valve 133 and a one way outlet valve 135, each valve being connected on the side remote from the cavity to corresponding fluid supply lines, not shown. The frame 118 rigidly connects joints 126, pads 119 and nutation joint 120.

Convexities 119 act as the universal joints between frame 118 and the reciprocating members represented by diagram 127. Accordingly, to best use the features of the nutating drive the contacts of convexities 119 should be on approximately the same plane as joint 120.

The rotary drive at connection 126 causes the frame 118 including the three pads 119 to nutate about joint 120 mounted on pump base 122. Each pad 119 moves nearly in a vertical direction (with a very small radius movement about joint 120). Only one pad 119 and diaphragm 127 can be in the full up or full down position at any one time. The full up or full down position is a cross-over position which occurs at the top or bottom, respectively, of each stroke. When one pad and diaphragm are in the cross-over position the other two diaphragm pairs are in mid stroke one engaged in a suction and the other engaged in a pumping stroke. The action moves progressively about the pump. Motion is continuous, all three cavities completing a full cycle for each revolution of the motor shaft.

The motion of the arms 117 is wave like, and is in fact sinusoidal. The up and down motion of the pads 119 and diaphragms 127 is also sinusoidal and thus the movement near each end of the stroke is very gradual, allowing a gentle opening and closing of the check valves. There is a speeding up of the motion approaching the midpoint of the stroke, and then a slowing down as the opposite end is approached until finally the motion becomes very slow again adjacent the opposite cross-over point. The result is a very gentle pumping action with smooth acceleration of the pumped fluid.

The maximum angle of nutation which is also the maximum angle of swing of arms 117 can be made very small or quite large as may be required by a specific application. The power transmission from the shaft 130 rotation to frame 118 nutation is very efficient. The rotary shaft motion is directly converted to a reciprocating motion in the rotary axis direction. Other means of avoiding cumulative rotation may, of course, be used.

By varying the size or speed of the pump it can be designed for any flow rate, and because the pumping action is by positive displacement, the pump can be designed for any operating pressure. I am not aware of any upper and lower limits on the size of the pump. Because there are no rotating parts in the pump itself, there is no requirement for balancing, and with the flow of fluid being quite gentle, vibration is inherently low.

An example of a pump size would be one having a base of 4" and three cavities. A pump such as this, driven by a 1/10 hp 850 rpm motor, would pump 3 US gal/min at 60 psi.

There are no close tolerances required in any part, thus the pump can be constructed of almost any plastic or metal material. The universal joint 126 at the end of the drive arm is not critical, nor is the pivot at the for shaft 130. The system is self centering and any play in the joints is taken up during operation. The flexible member 127 can be molded from a suitable elastomer with or without reinforcement as required by expected service.

The nutation frame 118 again supplies a rigid connection between the eccentric joint 126, the nutation point 120 and the universal joints at 119 considered as a class, with the advantages discussed generally and in connection with the first embodiment. As with the first embodiment the frame 118 and its connections may be considered as a ball crank (lever) with its fulcrum at 120, one force transfer at 126 and the other force transfer at the joints at 119 considered collectively.

For most applications the following criteria will apply as they do in the embodiments of FIGS. 4–5 and that of FIGS. 6–8:

(a) The nutation point will be located approximately on the shaft rotation axis. To the extent that the nutation point is eccentric relative to the shaft rotation axis, the reciprocating members will have differing stroke lengths.

(b) The reciprocation will be approximately parallel to the rotation axes. To the extent that these are not parallel an additional component will be introduced into relationship between rotation eccentricity and stroke length.

(c) The joints for the reciprocation link connection to the frame will be approximately in the same plane as the nutation point. To the extent that these are not in the same plane the last mentioned joints will describe a small excursion relative to the nutation point rather than remaining fixed.

(d) Although the embodiments shown utilize a rotary shaft coaxial with the nutation axis, the invention does not require a rotary shaft or eccentric arm. It is within the scope of the invention that the revolving point on a nutation frame equivalent to 26 or 126 need only describe a circle symmetrical about the nutation axis and no rotary member need be connected thereto. Thus the circular motion of the revolving point may be used for any purpose, for example on a machine tool to generate a circular tool path.

The invention includes such applications since no rotary degree of freedom is required between the revolving point and the reciprocation points

I claim:

1. Means for effecting conversion between rotary and reciprocating motion, comprising:
   a shaft rotatably mounted on a base to define a rotary axis and restricted against axial movement,
   a member mounted to be reciprocal on a reciprocation axis approximately parallel to and radially displaced from said rotary axis,
   a nutation frame mounted on the base at a fulcrum connection on said rotary axis for limited angular movement relative to its connection about those axes which are perpendicular to said rotary axis, but restricted against cumulative angular movement about said rotary axis, said connection allowing restricted reversing angular movement about said rotary axis, a rotation connection between said nutation frame and said rotary shaft at a location axially displaced from said nutation frame mounting and radially displaced from said rotary axis, said rotation connection allowing conversion between rotary movements of said shaft and nutating movement of said frame, a reciprocation connection between said nutation frame and said reciprocating member at a location radially displaced from said rotary axis and approximately in the plane of said fulcrum, said reciprocation connection allowing conversion between nutating movement of said frame and reciprocating movement of said member, said frame rigidly connecting said rotation connection, said reciprocation connection and said fulcrum connection.

2. Means for effecting conversion as claimed in claim 1 wherein there are a plurality of reciprocation connections, symmetrically disposed about said rotation axis.

3. Means for effecting conversion between rotary and reciprocating motion, comprising:

a shaft rotatably mounted on a base to define a rotary axis and restricted against axial movement, a member mounted to be reciprocal on a reciprocating axis which is approximately parallel to said axis and radially displaced therefrom, a nutation frame connected at a fulcrum connection to a base for limited angular movement relative to its connection about those axis perpendicular to the rotation axis but restricted against cumulative angular movement about said nutation axis, said connection allowing restricted reversing angular movement about said rotary axis, a rotation connection between said nutation frame and said rotary shaft at a location, axially displaced from the fulcrum connection and radially displaced from said rotary axis, said rotation connection allowing conversion between rotary movements of said shaft and nutating movement of said frame, a reciprocation connection between said nutation frame and said reciprocating member, said reciprocation connection allowing conversion between nutating movement of said frame and reciprocating movement of said member, said frame rigidly connecting said rotation connection, said reciprocation connection and said fulcrum.

4. Means for effecting conversion as claimed in claim 3 wherein there are a plurality of reciprocation connections, symmetrically disposed about said rotation axis.

5. Means for converting reciprocating motion to rotary motion along the same axis comprising:

a frame mounted to nutate at a nutation point about a nutation axis, means preventing cumulative rotation of said frame about said nutation axis, designed to allow a small reversing rotation of said frame about said axis during nutation, at least three reciprocating members each designed to reciprocate along an axis approximately parallel to said nutation axis, radially spaced therefrom, and symmetrically disposed thereabout, said reciprocating members each being connected to said nutation frame at reciprocation connections on said frame symmetrically disposed about said nutation point, said reciprocation connections allowing angular movement of said frame relative to said reciprocating members about all axes perpendicular to said nutation axis, a rotary shaft mounted for rotation about an axis approximately coaxial with said nutation axis, a rotation connection between said shaft and said frame, eccentrically disposed relative to said shaft and axially disposed from said nutation point, said rotation connection allowing rotation of said frame relative to said shaft about an axis coinciding with the line from said nutation point to said rotation connection, where said frame rigidly connects said nutation point and said reciprocation and rotation connections, whereby when said reciprocating members are operated cyclically about said nutation axis, rotation of said shaft is produced.

6. Means for converting rotary motion to reciprocating motion in a direction parallel to the rotation axis, comprising:

a frame mounted to nutate at a nutation point about a nutation axis, means preventing cumulative rotation of said frame about said nutation axis, designed to allow the small reversing rotation of said frame about said axis during nutation, at least one reciprocating member designed to reciprocate along an axis approximately parallel to said nutation axis and spaced therefrom, each said at least one reciprocating member being connected to said nutation frame at a reciprocation connection on said frame, each said reciprocation connection allowing angular motion of said frame relative to said reciprocating member about all axes perpendicular to said nutation axis, a rotary shaft mounted for rotation about an axis approximately coaxial with said nutation axis, a rotation connection between said shaft and said frame, eccentrically disposed relative to said shaft and axially disposed from said nutation point, said rotation connection allowing rotation of said frame relative to said shaft about an axis coinciding with the line from said nutation point to said rotation connection, where said frame rigidly connects said nutation point and said reciprocation and rotation connections.

7. Means for effecting conversion between circular and reciprocating motion, comprising:

a circular motion member mounted for circular motion about a nutation axis, and restricted against axial movement, a member mounted to be reciprocal on a reciprocation axis approximately parallel and radially displaced from said nutation axis, a nutation frame mounted on the base at a fulcrum connection on said nutation axis for limited angular movement relative to its connection about those axes which are perpendicular to said nutation axis, but restricted against cumulative angular movement about said nutation axis, said connection allowing restricted reversing angular movement about said nutation axis, a first connection between said nutation frame and said circular motion member at a location axially displaced from said fulcrum connection, and radially displaced from said nutation axis, said first connection allowing conversion between rotary movements of said circular motion member and nutating movement of said frame, a reciprocation connection between said nutation frame and said reciprocating member at a location radially displaced from said nutation axis and approximately in the plane of said fulcrum connection said reciprocation connection allowing conversion between nutating movement of said frame and reciprocating movement of said member, said frame rigidly connecting said first connection said reciprocation connection and said fulcrum connection.

* * * * *